United States Patent
Powers et al.

(10) Patent No.: US 10,244,025 B2
(45) Date of Patent: Mar. 26, 2019

(54) METHOD, APPARATUS, AND COMPUTER PROGRAM PRODUCT FOR CONTROLLING CONTENT DISTRIBUTION

(71) Applicant: Groupon, Inc., Chicago, IL (US)

(72) Inventors: Christopher Powers, Waukegan, IL (US); Mike Aparicio, Oak Park, IL (US)

(73) Assignee: GROUPON, INC., Chicago, IL (US)

( * ) Notice: Subject to any disclaimer, the term of this patent is extended or adjusted under 35 U.S.C. 154(b) by 200 days.

(21) Appl. No.: 14/823,449

(22) Filed: Aug. 11, 2015

(65) Prior Publication Data
US 2016/0050249 A1  Feb. 18, 2016

Related U.S. Application Data

(60) Provisional application No. 62/036,446, filed on Aug. 12, 2014.

(51) Int. Cl.
*H04L 29/06* (2006.01)
*H04L 29/08* (2006.01)
*G06Q 30/02* (2012.01)
*H04L 12/18* (2006.01)
*G06F 3/14* (2006.01)

(52) U.S. Cl.
CPC .......... *H04L 65/601* (2013.01); *G06Q 30/02* (2013.01); *H04L 12/1895* (2013.01); *H04L 65/608* (2013.01); *H04L 67/146* (2013.01); *H04L 67/26* (2013.01); *G06F 3/14* (2013.01); *G09G 2370/027* (2013.01)

(58) Field of Classification Search
CPC ... H04L 65/601; H04L 65/608; H04L 67/146; H04L 67/26; H04L 12/18; G06Q 30/02; G06F 3/14; G09G 2370/027
See application file for complete search history.

(56) References Cited

U.S. PATENT DOCUMENTS 8,463,773 B2 *  6/2013  Moshrefi .......... G06F 17/30817
                                                    707/708
8,896,765 B1 * 11/2014  White ................. H04N 5/4403
                                                    348/734

(Continued)

FOREIGN PATENT DOCUMENTS

EP   1 612 685 A1    1/2006
EP   2 511 811 A2   10/2012

OTHER PUBLICATIONS

International Search Report and Written Opinion of Application No. PCT/IB2015/056120 dated Nov. 13, 2015.

*Primary Examiner* — Blake J Rubin
(74) *Attorney, Agent, or Firm* — Alston & Bird LLP

(57) ABSTRACT

The method, apparatus, and computer program product provided herein provide for distribution of customized content to displays in a network. A display may receive video content for display from a transceiver device. Channel configurations may be user-configured to include content from any number of sources. Channel content may be generated based on a channel configuration to incorporate identified content and the channel content may be provided to transceiver devices. Alert messages may be pushed to channels, and takeovers of transceiver devices to stream a particular channel may be performed.

20 Claims, 10 Drawing Sheets

(56) References Cited

U.S. PATENT DOCUMENTS

| | | | | |
|---|---|---|---|---|
| 8,978,075 B1* | 3/2015 | Kaiser | H04N 5/44 | 725/105 |
| 9,389,773 B2* | 7/2016 | Koohestanian | G06F 3/0486 | |
| 9,456,130 B2* | 9/2016 | Kim | H04N 5/23219 | |
| 2008/0120668 A1* | 5/2008 | Yau | H04N 5/44582 | 725/110 |
| 2008/0154889 A1* | 6/2008 | Pfeiffer | G06F 17/3084 | |
| 2008/0307454 A1* | 12/2008 | Ahanger | G06Q 30/02 | 725/36 |
| 2009/0044216 A1* | 2/2009 | McNicoll | G11B 27/105 | 725/5 |
| 2009/0138907 A1* | 5/2009 | Wiser | H04N 5/4403 | 725/34 |
| 2009/0178093 A1* | 7/2009 | Mitsuji | H04N 7/1675 | 725/104 |
| 2009/0228919 A1* | 9/2009 | Zott | H04N 7/17318 | 725/34 |
| 2010/0332565 A1* | 12/2010 | Al-Shaykh | G06F 17/30905 | 707/912 |
| 2011/0176555 A1* | 7/2011 | Poder | H04L 65/605 | 370/463 |
| 2011/0191684 A1* | 8/2011 | Greenberg | G06F 3/01 | 715/719 |
| 2011/0252118 A1* | 10/2011 | Pantos | G06F 17/30053 | 709/219 |
| 2012/0054278 A1* | 3/2012 | Taleb | G06Q 50/01 | 709/204 |
| 2012/0079551 A1* | 3/2012 | Isozaki | H04N 21/4104 | 725/118 |
| 2012/0109345 A1* | 5/2012 | Gilliland | G06F 17/30749 | 700/94 |
| 2012/0221419 A1* | 8/2012 | Woxblom | G06Q 30/02 | 705/14.73 |
| 2013/0111529 A1* | 5/2013 | Yao | H04N 21/2393 | 725/93 |
| 2013/0113993 A1* | 5/2013 | Dagit | G06F 3/017 | 348/552 |
| 2013/0152139 A1* | 6/2013 | Davis | H04N 21/482 | 725/61 |
| 2013/0219429 A1* | 8/2013 | Hirsch | G06F 8/20 | 725/37 |
| 2013/0283393 A1* | 10/2013 | Hierro | G06F 21/10 | 726/27 |
| 2014/0006977 A1* | 1/2014 | Adams | H04L 51/32 | 715/758 |
| 2014/0053180 A1* | 2/2014 | Shoykher | G06F 3/017 | 725/14 |
| 2014/0164520 A1* | 6/2014 | Fan | H04L 67/1095 | 709/204 |
| 2014/0244488 A1* | 8/2014 | Kim | G06Q 20/123 | 705/39 |
| 2014/0258464 A1* | 9/2014 | McCoy | H04L 65/4084 | 709/219 |
| 2014/0282746 A1* | 9/2014 | Lin | H04N 21/482 | 725/61 |
| 2014/0344410 A1* | 11/2014 | Saremi | H04L 65/602 | 709/219 |
| 2014/0351870 A1* | 11/2014 | Amine | H04N 21/2665 | 725/92 |
| 2014/0351902 A1* | 11/2014 | Kim | H04L 63/1483 | 726/5 |
| 2014/0359673 A1* | 12/2014 | Striuli | H04L 65/4076 | 725/68 |
| 2014/0365611 A1* | 12/2014 | Praveenkumar | H04L 69/24 | 709/219 |
| 2014/0365856 A1* | 12/2014 | Costa-Requena | H04N 21/436 | 715/205 |
| 2014/0373040 A1* | 12/2014 | Lin | H04N 21/4126 | 725/25 |
| 2015/0007030 A1* | 1/2015 | Noy | G06F 3/0482 | 715/719 |
| 2015/0052556 A1* | 2/2015 | Rhoads | H04N 5/40 | 725/38 |
| 2015/0086174 A1* | 3/2015 | Abecassis | H04N 21/4126 | 386/201 |
| 2015/0156548 A1* | 6/2015 | Sirpal | H04N 21/4858 | 725/47 |
| 2015/0201223 A1* | 7/2015 | Osorio | H04N 21/2183 | 725/82 |
| 2015/0296033 A1* | 10/2015 | Jung | G06Q 50/01 | 709/217 |
| 2015/0373066 A1* | 12/2015 | Miao | G09G 5/14 | 715/753 |
| 2016/0007083 A1* | 1/2016 | Gurha | H04N 21/44222 | 725/13 |
| 2016/0048485 A1* | 2/2016 | Sherwood | G06F 17/2247 | 715/234 |
| 2016/0219121 A1* | 7/2016 | Yamagishi | H04N 21/6175 | |
| 2016/0373693 A1* | 12/2016 | Segal | H04N 7/15 | |

\* cited by examiner

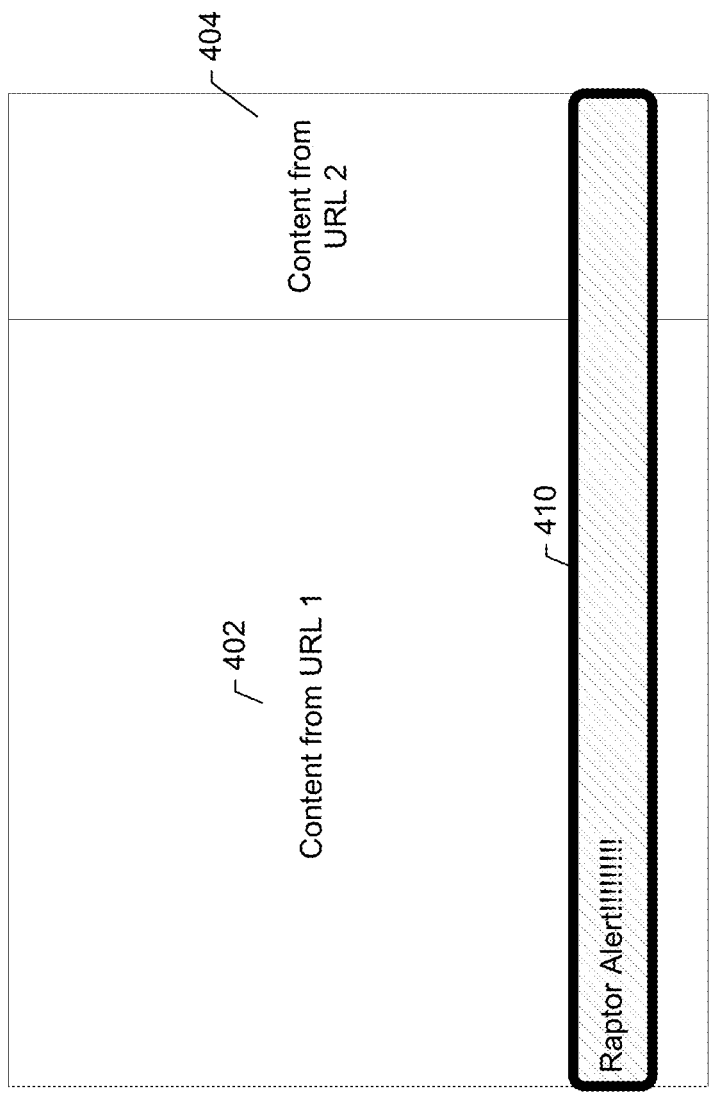

METHOD, APPARATUS, AND COMPUTER PROGRAM PRODUCT FOR CONTROLLING CONTENT DISTRIBUTION

CROSS REFERENCES TO RELATED APPLICATIONS

This application claims the benefit of priority to U.S. Provisional Application No. 62/036,446, filed Aug. 12, 2014 and titled, "Method, Apparatus, And Computer Program Product For Controlling Content Distribution," and is hereby incorporated by reference in its entirety.

BACKGROUND

Various embodiments of the invention are related to content distribution, and particularly to a method, apparatus and computer program product for configuring content channels and distributing the content for display. Applicant has discovered problems with and related opportunities relating to disseminating content to a plurality of displays. Through applied effort, ingenuity, and innovation, Applicant has solved many of these identified problems by developing a solution that is embodied by the present invention, which is described in detail below.

BRIEF SUMMARY

A method, apparatus, and computer program product are therefore provided for controlling content distribution to a plurality of transceiver devices in communication with displays.

A computer-implemented method is provided for controlling content distribution, the method comprising receiving a channel configuration from a channel configuration module, the channel configuration comprising at least one uniform resource locator (URL), storing the channel configuration in association with the channel identifier on a content distribution apparatus, receiving an indication of at least one transceiver device selected from a plurality of transceiver devices, wherein the indication indicates the at least one transceiver device is to be associated with the channel identifier, and associating the channel identifier with the at least one transceiver device, such that channel content generated based on the channel configuration and associated with the channel identifier is received by the transceiver device via a network interface and transmitted by the transceiver device for display. In some examples, the method includes generating the channel content based on the channel configuration. The channel configuration may further comprise at least two URLs and a respective position and a respective size for each of the at least two URLs with respect to the channel content.

In some embodiments, the channel configuration comprises at least two URLs and a respective duration for which each of the two URLs are to be displayed. In some embodiments, the method further includes receiving an indication of a takeover channel identifier, and causing transmission of a takeover channel identifier to all of the plurality of transceiver devices such that associated takeover content is transmitted by the transceiver device.

In some embodiments, the method further includes receiving an indication of an alert message, and causing respective channel content associated with all available channel identifier to be updated to include the alert message. In some examples, the method includes causing transmission of the alert message to the content distribution apparatus from a remote user device.

In some embodiments, the method includes receiving an indication of local content on a remote user device, causing transmission of the local content to the content distribution apparatus, and associating the local content with the channel configuration. In some examples, the at least one URL is associated with promotional content provided by a promotion and marketing service and customized for a provider, and wherein the channel configuration comprises at least one additional URL associated with content provided by the provider. In some examples, the at least one URL is associated with provider metric content provided by a promotion and marketing service, wherein the provider metric content describes at least provider profit based on data collected by the promotion and marketing service.

An apparatus for controlling content distribution is provided, the apparatus comprising a channel configuration module, configured for, when executed by a processor, accessing a channel configuration provided by a remote user device and stored in associated with a channel identifier, the channel configuration comprising at least one uniform resource locator (URL), and a transceiver device configuration module, configured to, when executed by a processor, access a transceiver device configuration comprising an association of a transceiver device and the channel identifier, such that channel content generated based on the channel configuration and associated with the channel identifier is received by the transceiver device via a network interface and transmitted by the transceiver device for display.

In some examples embodiments, the apparatus further includes a channel content generation module, configured to, when executed by a processor, generate the channel content based on the channel configuration. In some examples, the channel configuration further comprises at least two URLs and a respective position and a respective size for each of the at least two URLs with respect to the channel content.

In some examples, the channel configuration comprises at least two URLs and a respective duration for which each of the two URLs are to be displayed. The apparatus may further include a takeover module configured to, when executed by a processor, a) receive an indication of a takeover channel identifier, and b) cause transmission of a takeover channel identifier to all of the plurality of transceiver devices such that associated takeover content is transmitted by the transceiver device.

In some examples, the apparatus comprises an alert module configured to, when executed by a processor, a) receive an indication of an alert message, and b) cause respective channel content associated with all available channel identifier to be updated to include the alert message. In some embodiments, the alert module is further configured to, when executed by the processor, cause transmission of the alert message to the content distribution apparatus from a remote user device.

The apparatus may further include a channel content generation module, configured to, when executed by a processor, receive an indication of local content on a remote user device, cause transmission of the local content to the content distribution apparatus, and associate the local content with the channel configuration. The at least one URL may be associated with promotional content provided by a promotion and marketing service and customized for a provider, and the channel configuration may comprise at least one additional URL associated with content provided by the provider. The at least one URL is associated with provider metric content provided by a promotion and marketing service, wherein the provider metric content describes at least provider profit based on data collected by the promotion and marketing service.

A computer program product for controlling content distribution is provided, the computer program product comprising at least one non-transitory computer-readable medium having computer-readable program instructions stored therein, the computer-readable program instructions comprising a channel configuration module, configured for, when executed by a processor, accessing a channel configuration provided by a remote user device and stored in associated with a channel identifier, the channel configuration comprising at least one uniform resource locator (URL), and a transceiver device configuration module, configured to, when executed by a processor, access a transceiver device configuration comprising an association of a transceiver device and the channel identifier, such that channel content generated based on the channel configuration and associated with the channel identifier is received by the transceiver device via a network interface and transmitted by the transceiver device for display.

In some examples, the computer program product further comprises a channel content generation module, configured to, when executed by a processor, generate the channel content based on the channel configuration. The computer program product of claim 21, wherein the channel configuration further comprises at least two URLs and a respective position and a respective size for each of the at least two URLs with respect to the channel content. In some examples, the channel configuration comprises at least two URLs and a respective duration for which each of the two URLs are to be displayed.

The computer program product may further include a takeover module configured to, when executed by a processor, a) receive an indication of a takeover channel identifier, and b) cause transmission of a takeover channel identifier to all of the plurality of transceiver devices such that associated takeover content is transmitted by the transceiver device.

The computer program product may further includes an alert module configured to, when executed by a processor, a) receive an indication of an alert message, and b) cause respective channel content associated with all available channel identifier to be updated to include the alert message.

In some embodiments, the alert module is further configured to, when executed by the processor, cause transmission of the alert message to the content distribution apparatus from a remote user device.

The computer program product may include a channel content generation module, configured to, when executed by a processor, receive an indication of local content on a remote user device, cause transmission of the local content to the content distribution apparatus, and associate the local content with the channel configuration.

In some examples, the at least one URL is associated with promotional content provided by a promotion and marketing service and customized for a provider, and wherein the channel configuration comprises at least one additional URL associated with content provided by the provider. The at least one URL is associated with provider metric content provided by a promotion and marketing service, wherein the provider metric content describes at least provider profit based on data collected by the promotion and marketing service.

BRIEF DESCRIPTION OF THE SEVERAL VIEWS OF THE DRAWINGS

FIGS. 3A-3E and 4 are example screen displays according to example embodiments;

DETAILED DESCRIPTION

Figure 1:
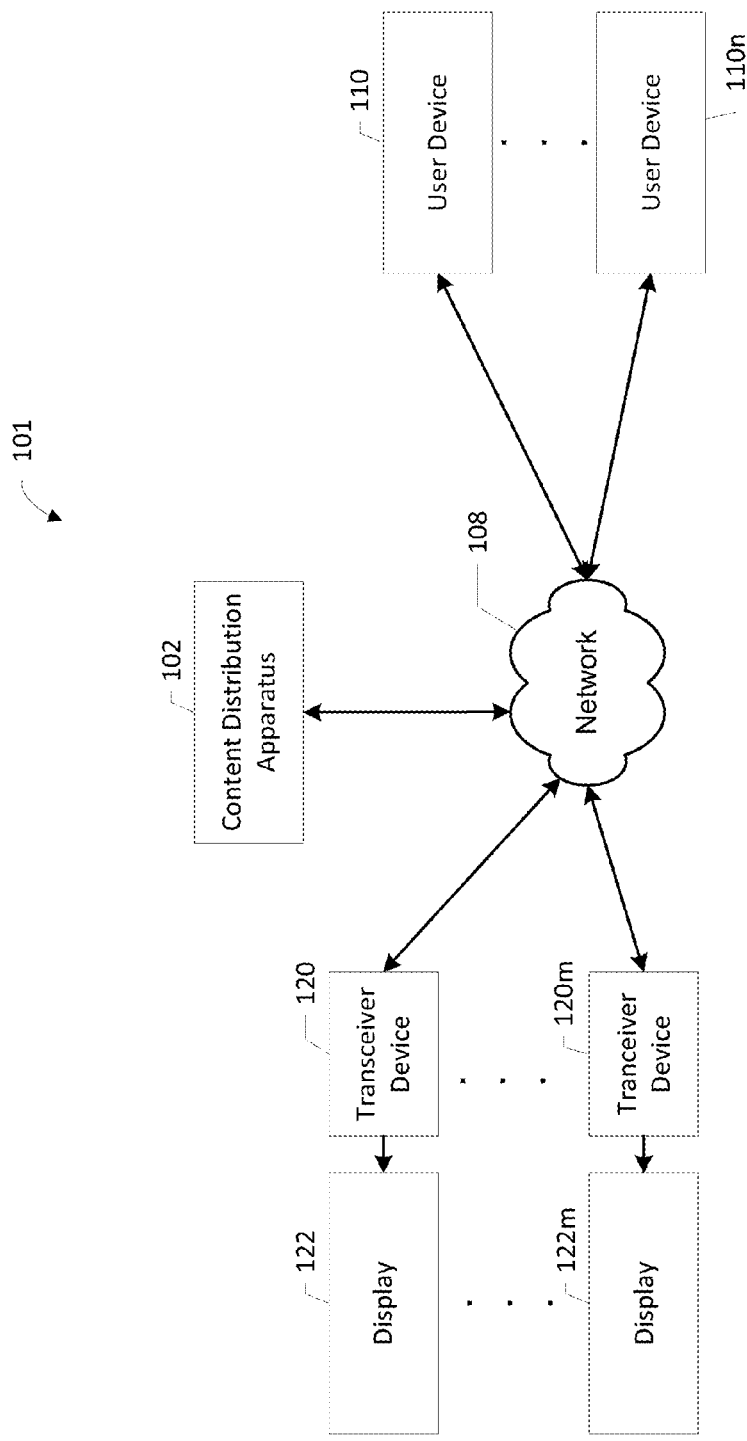
FIGS. 1 and 2 are schematic representations of a system for distributing content according to example embodiments.

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the other computing device or may be received indirectly via one or more intermediary computing devices, such as, for example, one or more servers, relays, routers, network access points, base stations, and/or the like. Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

Overview

In some environments, it may be desirable to disseminate information to various individuals in remote locations, such as by numerous display screens located throughout a network. Some such implementations may require that each display communicates with a local device (e.g., server, tablet, or other computing device) to access the desired content. The local device may be expensive to install, particularly in mass quantities as needed by each display location. In some instances, the local device may be difficult to configure or maintain remotely and may require an authorized user to physically visit the station in order to configure the device and/or to troubleshoot technical issues.

Furthermore, in some examples, it may be desirable for various users, groups of users, business entities and/or the like to configure various portions of a display screen independently of one another. Current solutions may offer only a single control point that may require coordination between such user groups and administration via a particular user or group of users.

A method, apparatus, and computer program product are therefore provided to control content distribution to a plurality of devices in a network. The method, apparatus, and computer program product may be provided via a content distribution apparatus. In some examples, a user may configure a channel to include content from a number of URLs (uniform resource locator), images, video, and/or other media sources. In some instances, more than one URL may be provided so that content from different locations may be provided via one channel. A "channel configuration" may therefore be considered any information provided by a user to define a channel and may include any number of URLs, sizing and positioning information, images, video content, and/or a channel name. A "channel identifier" may be considered any unique identifier associated with a channel configuration, such as a URL or other identifier.

A transceiver device may be configured to be tuned to a particular channel based on a channel identifier. Based on the associated channel configuration, "channel content" may be generated by the content distribution apparatus to incorporate the content identified in the associated channel configuration. The channel content may therefore be considered composite web content generated from a plurality of sources. The provision of channel content to a transceiver device may be achieved by "tuning" the associated transceiver device to a channel such that the transceiver device receives the generated channel content. The transceiver device may convert the channel content to a video format and transmit the video content to a display.

Example Embodiment

FIG. 1 is a schematic representation of a content distribution system 101 for controlling content distribution according to an example embodiment. In general, content distribution apparatus 102 provides content distribution functionality such as channel configuration, transceiver device configuration, user administration, and/or the like, as described with respect to the example embodiments provided herein. Content distribution apparatus 102 may be implemented as a personal computer and/or other networked device, such as a server or distributed system configured to communicate over network 108 with user device(s) 110 and transceiver device(s) 120. Content distribution apparatus 102 will be described in further detail with respect to FIGS. 2 and 7.

Network 108 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, network 108 may include a cellular telephone, an 802.11, 802.16, 802.20, and/or WiMax network. Further, the network 108 may include a public network, such as the Internet, a private network, such as an intranet, or combinations thereof, and may utilize a variety of networking protocols now available or later developed including, such as, but not limited to, TCP/IP based networking protocols.

Any number of user devices 110-110n may be implemented as a personal computer and/or other networked device, such as a cellular phone, tablet computer, mobile device, etc., that may be used to access the content distribution apparatus 102, and in some embodiments, transceiver devices 122. User devices 110-110n are illustrated to emphasize that numerous user devices may be implemented within the system 101, but hereinafter may be described as user device 110 for simplicity. As such, a user may use user device 110 to view example displays provided by the content distribution apparatus 102 such as those provided in FIGS. 3A-3E, to configure content channels and transceiver devices as described herein. In some embodiments, input parameters defining the content configurations and transceiver device configurations may be provided to the content distribution apparatus 102 via a user device 110. In some embodiments, a user may direct the content distribution apparatus 102 to provide alerts and initiate a takeover of transceiver devices 120 via user device 110, as described in further detail herein.

Any number of transceiver devices 120-120m may be operative in the content distribution system 101 to access content provided by the content distribution apparatus 102 and provide the content to respective displays 122-122m for display. Numerous instances of displays 122-122m and corresponding transceiver devices 120-120m may be present but for simplicity may be referred to hereinafter as transceiver device 120 and display 122. While illustrated as display and transceiver device pairs, in some examples, one transceiver device 120 may indeed provide content to more than one display 122, for example.

Transceiver device 120 may be implemented on any type of device configured to communicate with content distribution apparatus 102 via network 108 and transmit content for display on display 122. For example, transceiver device 120 may be implemented on a personal computing station, tablet computer, and/or a lightweight streaming device, such as Chromecast, Airtame, and/or Sugarcube, for example, which may be configured to connect to a display 122 by high definition multimedia interface (HDMI), and to communicate wirelessly with content distribution apparatus 102 via network 108. While transceiver device 120 is commonly referred to throughout as a streaming device physically connected to a display 120 and communicative wirelessly with content distribution apparatus 102, it will be appreciated that many other configurations of content distribution system 101 may exist. For example, transceiver device 120 may be directly wired to content distribution apparatus 102, and/or configured to communicate wirelessly with display 122. In some examples, the transceiver 120 may be implemented within the same housing as that of the display 122.

Display 122 may be a television monitor or computer monitor, for example, configured to receive content from transceiver device 120 in a format compatible for display by display 122. For example, in embodiments in which transceiver device 120 is embodied as a Chromecast, the transceiver device 120 may receive streamed browser content from content distribution apparatus 102, convert the browser content to video format compatible with HDMI, and transmit the video content for display.

Figure 2:
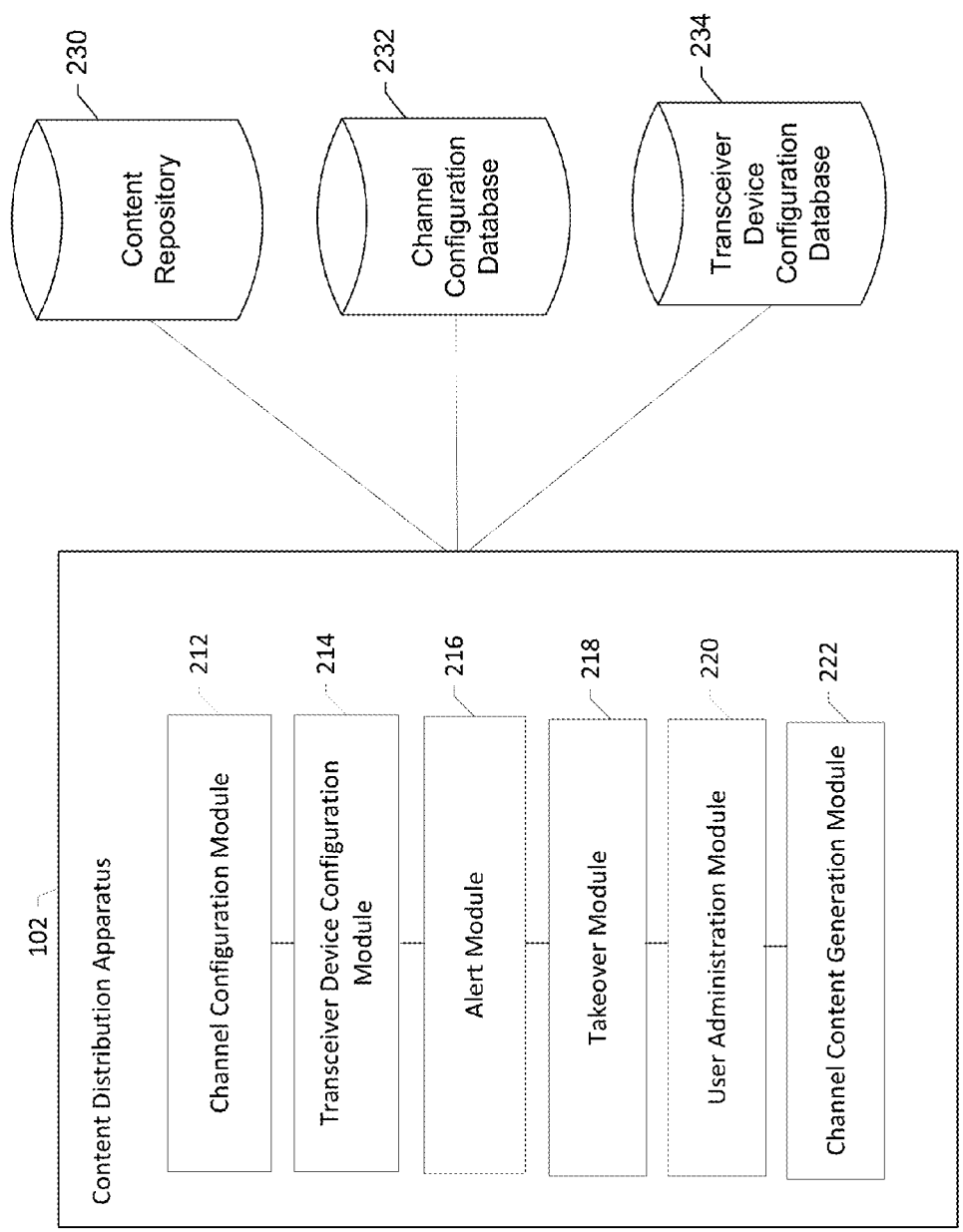

FIG. 2 is another schematic representation of a system 101, or portion thereof, for controlling content distribution according to an example embodiment. Content distribution apparatus 102 may integrate and/or collectively provide the functionality of channel configuration module 212, transceiver device configuration module 214, alert module 216, takeover module 218, user administration module 220 and/or channel content generation module 222. Content distribution apparatus 102 may additionally store and/or retrieve data from content repository 230, channel configuration database 232, and/or transceiver device configuration database 234.

In general, channel configuration module 212 enables a user of user device 110 to provide custom channel configurations defining any number of URLs, images, or other content to be included in a channel and provided to a transceiver device 120 for display. Channel configurations may be stored on channel configuration database 232, and may refer to content stored on content repository 230, or any other content accessible over network 108, for example. The content channel configurations may therefore be stored for reuse and/or modification. The channel configuration module 212 may provide channel configurations to the content channel generation module 222 so that channel content may be generated and provided on user interface displays such as the examples displays of FIGS. 3A-3C, described in detail below.

Transceiver device configuration module 214 may provide the ability for a user of user device 110 to direct any transceiver device 120 to access content associated with a channel configuration. The transceiver device configuration module 214 may provide a user with a listing of active transceiver devices 120 on network 108, and may enable the user to point the transceiver device 120 to a particular channel configuration such that the content distribution apparatus 102 and/or channel content generation module 222 provides the intended content to the transceiver device 120. A user may therefore change displayed content on any of the displays 122 from a remote location, and/or configure multiple displays 122 (via their respective transceiver devices 120) to display the same customized content. In some examples, a group of transceiver devices may be defined such that all the transceiver devices in a group may be configured to be tuned to the same channel at any given time. Therefore, a number of displays in a department, geographic vicinity, and/or the like may display the same content. The transceiver device configuration database 234 may maintain associations of transceiver devices to content channel configurations. The transceiver device configuration module 214 may additionally or alternatively provide a user interface display for making such configurations.

Alert module 216 provides a use the ability, such as with user device 110, to push an alert message to any number of displays. For example, the alert module 216 may provide a user interface such as that illustrated in FIG. 3E, allowing a user to enter an alert message. The alert message may be communicated to the channel configuration module 212 and/or channel content generation module 222 so that channel content may be temporarily modified to include the alert message.

Takeover module 218 enables a user, such as with user device 110, to temporarily override available transceiver devices 120 to tune to a particular channel, or takeover channel. The takeover module 218 may therefore communicate with transceiver device configuration module 214, and may provide a user interface for entry of a channel identifier of the corresponding channel to which the available transceiver devices 120 and/or or a group of transceiver devices 120 will be tuned.

The user administration module 220 may provide for configuration of user access to the various modules 212, 214, 216, 218, and/or the like. For example, one group of users may have authority to configure channels while another group of users may have the ability to configure transceiver devices. Similarly, a defined set of users may have authority to push alerts or initiate a takeover of the transceiver devices. The user administration module 220 may therefore control access to such functionality, and provide for authorized users to add and/or remove users from authorized user groups.

The channel content generation module 222 may access channel configurations as provided by the channel configuration module 212 to generate channel content to be provided to transceiver 120 and displayed on display 122. The channel content generation module 222 may incorporate content identified in a channel configuration such that the content is accessible via a single URL, for example. In some embodiments, the channel content generation module 222 may access alert module 216 to incorporate alerts into the channel content.

In general, the content repository 230 may include storage space for content that may be included in a channel configuration. In some embodiments, a user may publish or upload content to the content repository 230 while configuring a channel. The content may then become available to other users and channels by accessing the content repository 230.

The channel configuration database 232 may be used to store the user defined channel configurations. For example, each channel configuration identifier may be stored in association with respective channel configurations, including references to any of the URLs or other media included in the channel configuration.

The transceiver device configuration database 234 may maintain a record for each transceiver device available on network 108, for example, and may include associations to channel configurations indicating to which channel a transceiver device is tuned. The transceiver device configuration database 234 may, in some embodiments, comprises data defining groups of transceiver devices.

FIGS. 3A-3E are example displays that may be provided by content distribution apparatus 102 for a user to control the distribution of content. Any of the displays may be accessed with user device 110, for example.

Figure 3B:
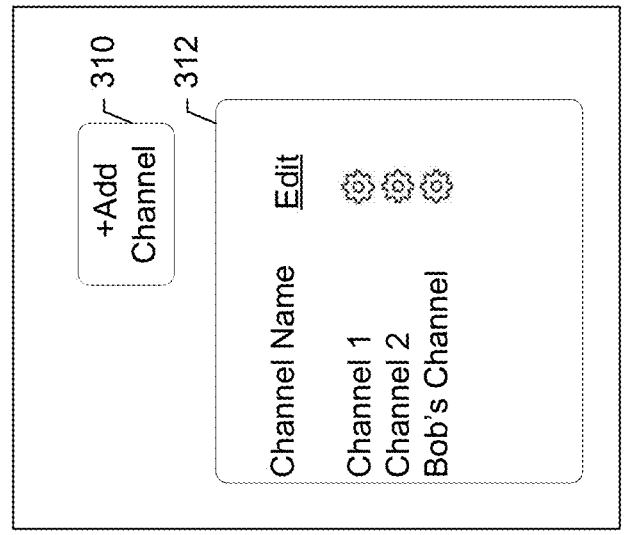
Figure 3A:
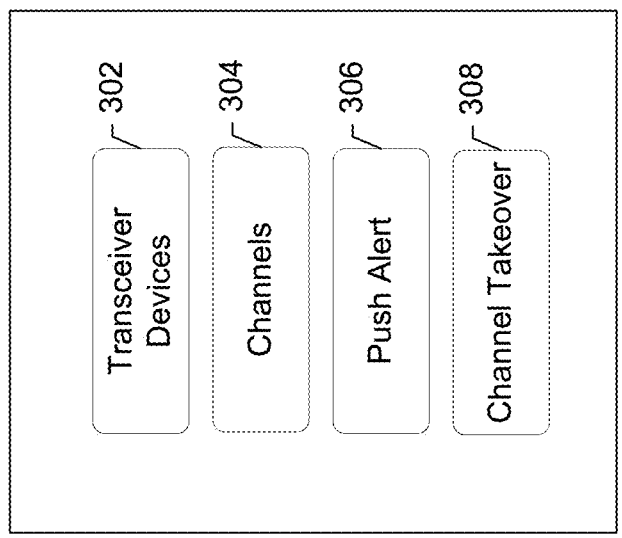

FIG. 3A is an example display providing a menu to access various functionality provided by content distribution apparatus 102. For example, as shown by indicator 302, an option for configuring transceiver devices 120 may be provided. Upon selection of the transceiver devices option, the transceiver device configuration module 214 and/or the like may provide a listing of available transceiver devices 120 and/or groups of transceiver devices 120 on network 108. The available transceiver devices 120 may include any transceiver device 120 configured to operate on network 108. The transceiver device configuration module 214 and/or the like may additionally provide channel identifiers of any channel to which a transceiver device 120 is tuned, and/or the status of any of the transceiver devices 120, such as whether or not the transceiver device 120 is broadcasting to a respective display 122. Furthermore, transceiver device configuration module 214 may provide a user with an option to tune a transceiver device 120 to a different channel, such as by entering a channel identifier. In response, the channel content being provided to an associated display 122 may change to reflect the content defined by the identified channel configuration. In some examples, a user may add and/or remove transceiver devices 120 from a group of transceiver devices, and/or create and name a group of transceiver devices 120, such as "engineering department," for example.

As shown by indicator 304, an option for providing channel configurations may be provided. Upon selection of the channel option, a display such as that of FIG. 3B may be displayed. Channel configurations will be described in further detail with respect to FIG. 3B.

As shown by indicator 306, an option to provide a push alert may be provided. Upon selection of the push alert option, a display such as that of FIG. 3E may be provided. Alerts will be described in further detail with respect to FIG. 3E.

As shown by indicator 308, an option for performing a channel takeover may be provided. Selection of the channel takeover option may result in a display such has that of FIG. 3D, described in further detail hereinafter.

FIG. 3B is an example display that may be provided by channel configuration module 212 for enabling a user to select to add a channel, as shown by indicator 310. Selection of the add channel option may result in display of a display such as that of FIG. 3C. In area 312, the channel configuration module 212 provides a listing of channel configurations, as may be provided by channel configuration database 232. Each channel has a name and a corresponding edit link, which may transition a display screen to a display similar to that of FIG. 3C, allowing a user to edit the channel configuration.

Figure 3C:
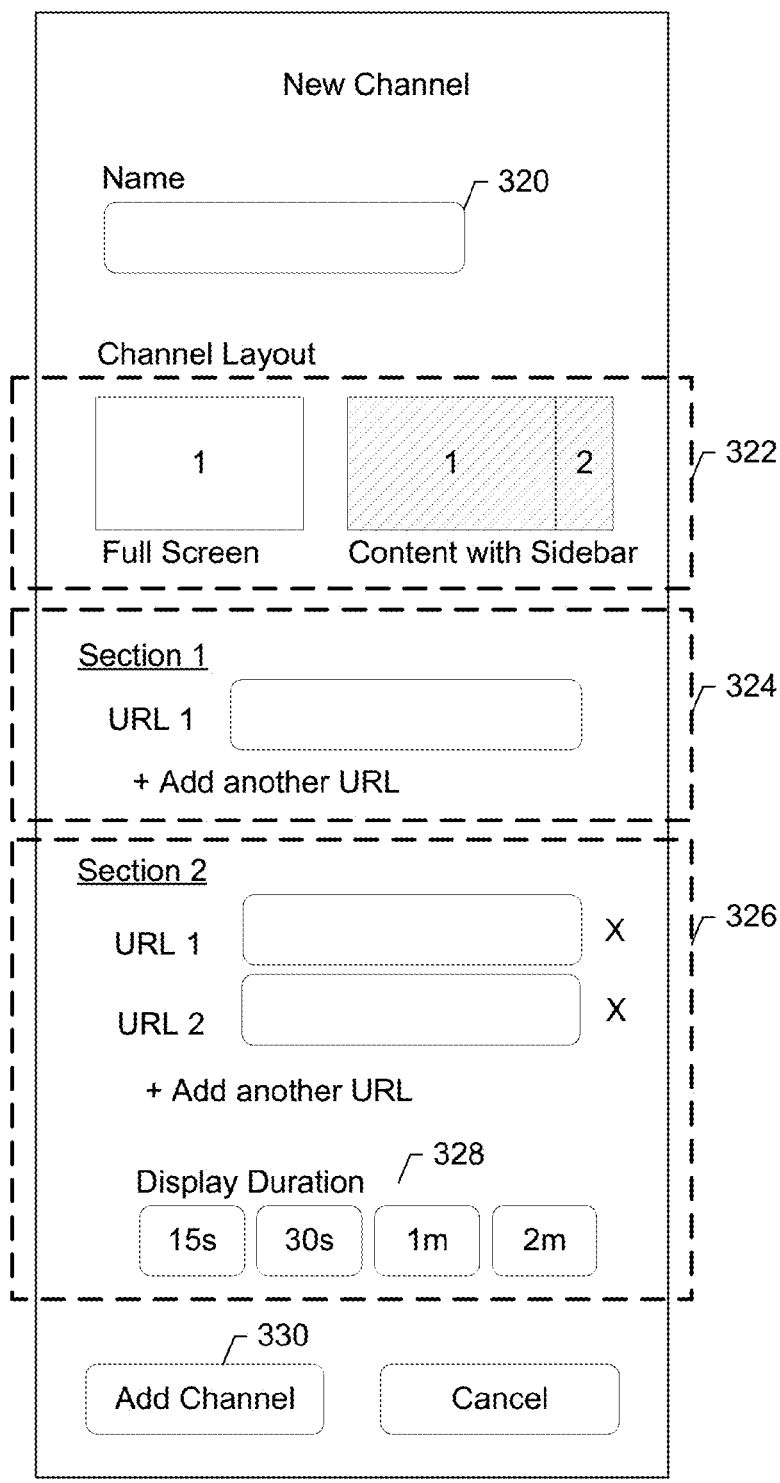

FIG. 3C is an example display that may be provided by channel configuration module 212 for enabling a user to add a new channel configuration. In some embodiments, a modified version of the display may be provided with information prefilled to allow for editing of an existing channel configuration. In area 320, a user may enter a name for the channel. In area 322, the user may choose a layout for how the content will be displayed. The full screen option, for example, may be used for a channel configuration comprising only one URL or other media source to utilize the entire display screen. Another layout option referred to as "content with sidebar" is also provided. The layout includes two sections, and may provide for content associated with a first content source (e.g., a URL) in a main portion of the display, and an additional portion for content associated with a second content source. While the displayed layouts are provided as selectable options for a channel configuration, many other layouts may be presented, or may be user-configured. For example, a layout may define the number of sections, the size and/or dimensions of each section, and/or the positioning of each section relative to the layout and/or other sections. A layout for a channel configuration may include any number of sections, and each section may be associated with any number of URLs.

Areas 324 and 326 provide for configurations of section 1 and 2, respectively. In this example, the content with sidebar is selected in area 322, so areas 324 and 326 are provided as a result of the section. Depending on how many sections are present in the selected layout, an area to configure each section may be provided. Area 324 provides a URL input. A user may therefore enter a URL for content to be displayed in section 1. An option to add another URL to be rotated in section 1 is also provided, but in the illustrated example, only one URL is configured for section 1.

Area 326 provides for configuration of section 2, the sidebar. In this example, a user has selected to add a second URL, and an option for display duration is presented in area 328. The two URLs a user enters may therefore be rotated for the indicated duration. For example, content provided via URL 1 may be displayed for 15 seconds, followed by content provided via URL 2 for 15 seconds, on a continual rotational basis within section 2. Display duration options of 15 seconds, 30 seconds, 1 minute, and 2 minutes are provided as examples, but any configuration, including a free-form entry of any duration, and/or different durations for each URL, may be available.

The URLs provided in areas 324 and/or 328 may enable a user to provide content from various sources. For example, an image or video file may be stored in content repository 230 and accessed via a URL. Furthermore, a URL to an application server operative in network 108 (or via content distribution apparatus 102) may provide access to a web application and/or may provide pertinent information to those in the vicinity of a display 122.

Selection of the add channel button 328 may result in the channel configuration being saved to channel configuration database 232. The channel may then appear on the channel listing, as provided in area 312 of FIG. 3B. The channel configuration may be assigned a channel identifier, and may be made available to transceiver devices 120 such that the channel content generated based on the channel configuration may be displayed on displays 122.

Although not illustrated, in some example embodiments, a user may indicate a location of local content on user device 110 that the user wishes to publish to a channel. In this regard, upon creation or editing of the channel configuration, the specified content may be transmitted or uploaded to the content distribution apparatus 102. The content may be stored on content repository 230, and the corresponding URL may be included in the content configuration.

Figure 3E:
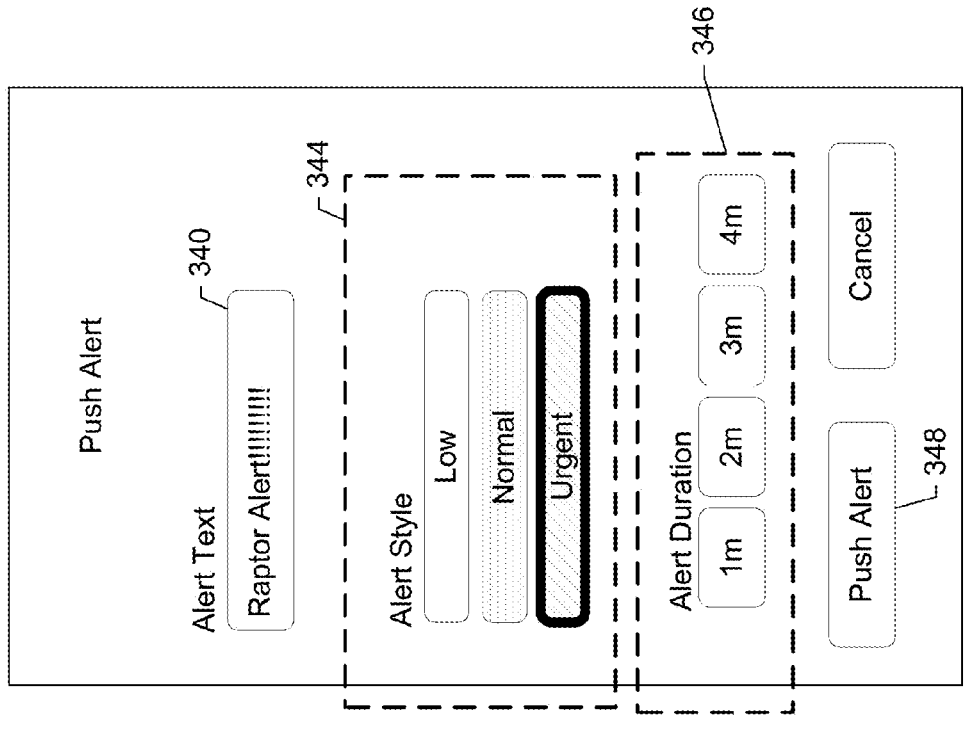
Figure 3D:
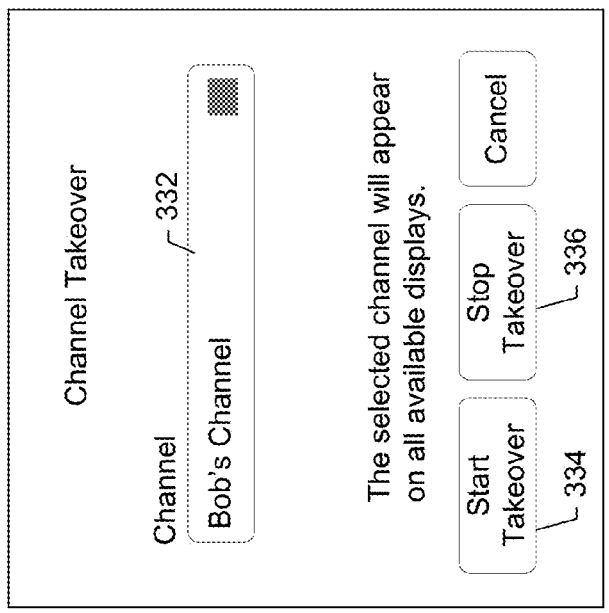

FIG. 3D is an example display that may be provided by takeover module 218 for a user to initiate a channel takeover. Dropdown 332 provides a listing of available channels, such as provided by the channel configuration database 232 and/or channel configuration module 212. A user may select a takeover channel in the dropdown 332 to indicate which channel the user wishes to broadcast to transceiver devices 120 and/or group of transceiver devices 120. A user may select option 334 to start a takeover of all available transceiver devices 120 such that corresponding displays 120 show the channel web content generated based on the selected channel configuration. A user may stop the takeover by selecting option 336, at which point the transceiver devices 120 may return to access the previously tuned channel. The transceiver device configuration database 234 may be updated accordingly to reflect the takeover and stoppage of the takeover. While not illustrated in FIG. 3D, in some embodiments, a user may select the transceiver devices 120 to which the takeover will be applied, and/or a duration for which the takeover will occur prior to the transceiver device configurations reverting to the previously displayed channel. The takeover functionality provided by takeover module 218 may enable a user to temporarily provide broadcasting of a special event or major news event company-wide, for example.

FIG. 3E is an example display that may be provided by the alert module 216 for pushing alerts to available transceiver devices 120, group of transceiver devices 120, and corresponding displays 122. A user may use user device 110 in order to provide the alert message to remote displays 122. In area 340, a user may provide a message to be disseminated. In area 344, an alert style may be selected. In this example embodiment, an option for low, normal, and urgent is provided. The alert style may dictate the size, color, positioning, and/or the like of the alert message with respect to the channel configuration. An example display of an alert message is provided in FIG. 4. Additionally on the display of FIG. 3E, a user may select an alert duration in area 346 for which an alert may be displayed before returning to the configured channel. Selection of button 348 may cause modification of channel configurations, such as in the channel configuration database 232 and/or channel configuration module 212, and such that all available transceiver devices 120 receive the alert for display. Although not illustrated, in some example embodiments, a user may select specific transceiver devices 120 to receive the alert message.

FIG. 4 illustrates example channel content that may be provided on a display 122. For example, a channel configured using the display of FIG. 3C may include two sections 402 and 404, providing content retrieved from URL 1 and URL 2 respectively. The display also reflects an alert message 410 that has been pushed to all channels such that the alert message appears with the designated alert style and for the specified duration. Note that a large portion of sections 402 and 404 are still visible even though the alert covers a small portion of the sections.

Figure 5:
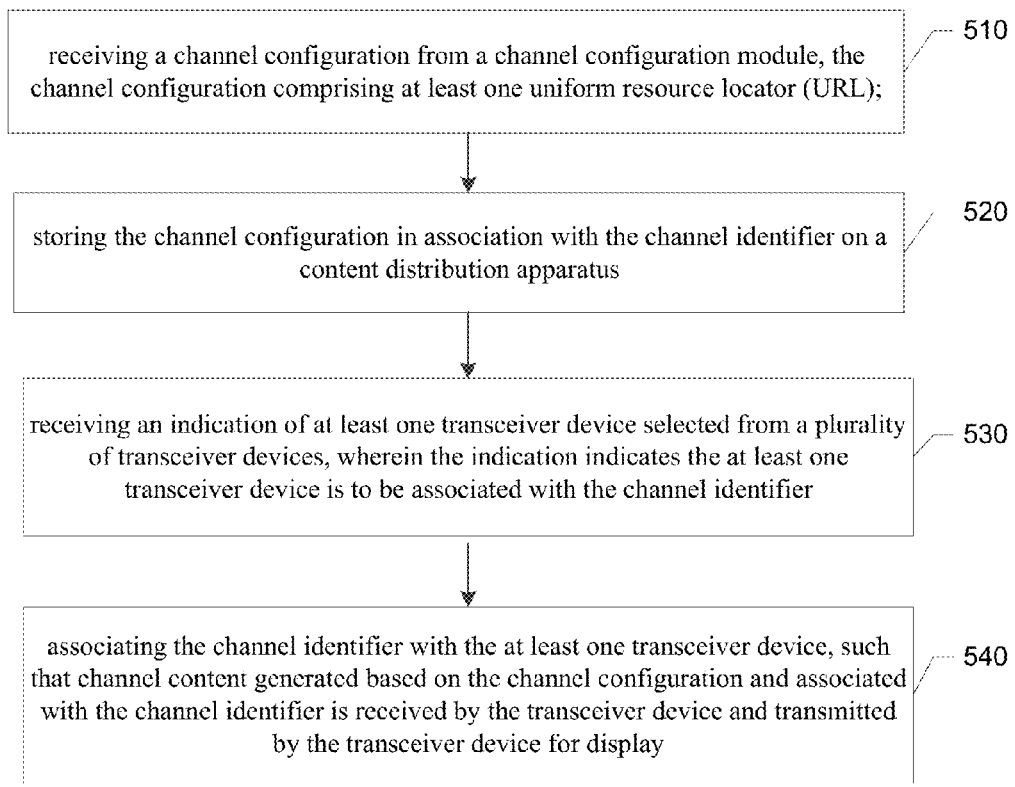
FIG. 5 is a flowchart illustrating operations for distributing content according to examples embodiments.

FIG. 5 is a flowchart of operations that may be performed by content distribution apparatus 102, according to some example embodiments, for distributing configured content. As shown by operation 510, content distribution apparatus 102 may include means, such as channel configuration module 212 and/or the like, for receiving a channel configuration from a channel configuration module, the channel configuration comprising at least one uniform resource locator (URL). As described above with respect to FIG. 3C, a user may provide information relating to a channel configuration via a graphical user interface provided on a user device 110. The channel configuration may include any number of URLs, positioning and sizing information, durations, layout information, a channel name, and/or the like. The positioning and/or sizing information may indicate how content associated with a respective URL may be placed and sized with respect to the channel content as a whole, and/or relative to another section of the channel configuration that may be associated with a different URL.

As shown by operation 520, content distribution apparatus 102 may include means, such as channel configuration module 212, channel configuration database 232 and/or the like, for storing the channel configuration in association with the channel identifier on a content distribution apparatus 102. In some examples, the channel configuration and channel identifier may be stored on the channel configuration database 232. The channel identifier may be a unique identifier such that when the channel content generation module 222 receives a request for channel content, the module 222 may access the other information included in the channel configuration based on the channel identifier.

As shown by operation 530, content distribution apparatus 102 may include means, such as channel configuration module 212 and/or the like, for receiving an indication of at least one transceiver device selected from a plurality of transceiver devices 120, wherein the indication indicates the at least one transceiver device is to be associated with the channel identifier. In this regard, a user may provide input to a user interface to control which display 122 displays content from which channels, with a user device 110 that may be remote from any of the displays 122 and/or transceiver devices 120.

As shown by operation 540, content distribution apparatus 102 may include means, such as channel configuration module 212, transceiver device configuration module 214, transceiver device configuration database 234, and/or the like, for associating the channel identifier with the at least one transceiver device 120, such that channel content generated based on the channel configuration and associated with the channel identifier is received by the transceiver device and transmitted by the transceiver device for display. In some examples, the at least one transceiver device 120 may include a group of transceiver devices 120.

For example, the transceiver device configuration module 214 and/or transceiver device configuration database 234 may facilitate associations such that an identifier of a transceiver device 120 is associated with a channel identifier. Said differently, the transceiver device 120 is tuned to the identified channel.

In instances the transceiver device 120 is operative on network 108, the channel content generation module 222 may generate channel content as defined by the channel configuration module 212 and/or channel configuration database 232, based on the associated channel identifier. In some instances, the channel may have one associated dedicated URL by which to provide the channel content (e.g., composite content of any number of URLs). The transceiver device 120 may access the channel content, convert the channel content to a video format, and provide the video content to display 122.

As another example, the channel content generation module 222 and/or the channel configuration module 212 may render hypertext markup language for transmission to the transceiver device 120. Still further, the channel content generation module 222 and/or the channel configuration module 212 may stream content to the transceiver device 120 according to a known streaming protocol, for example.

Figure 6:
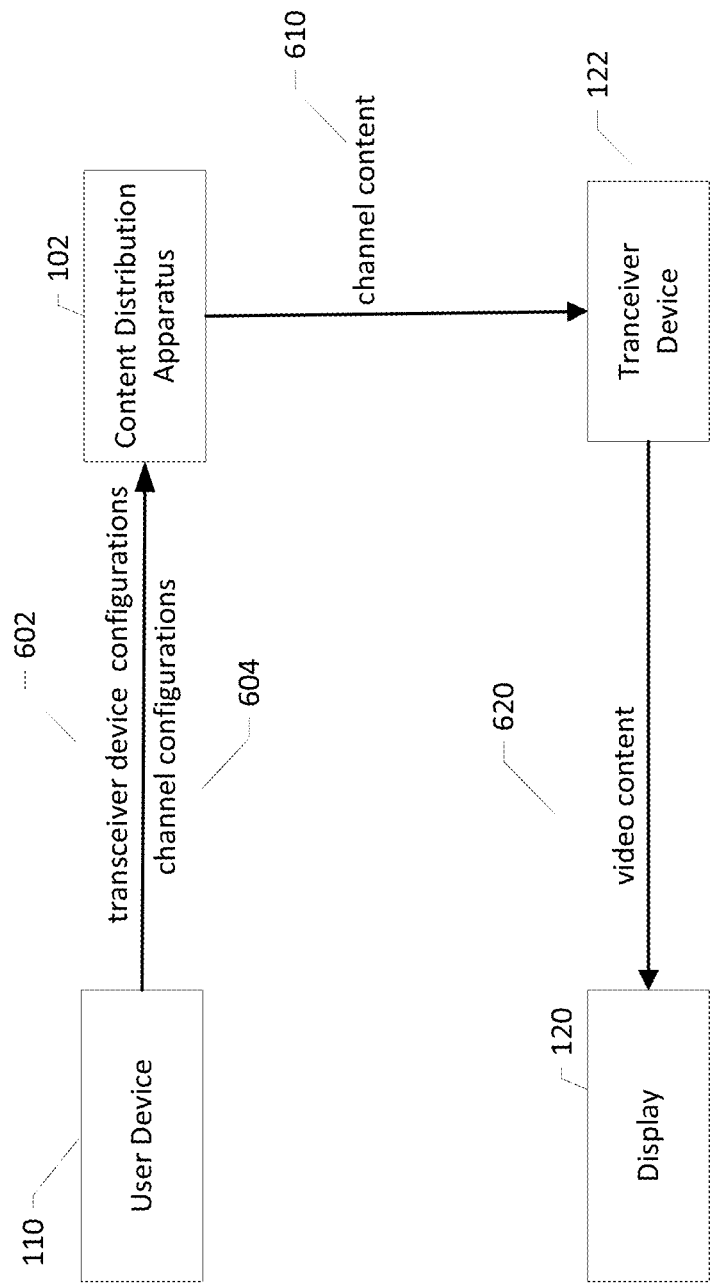
FIG. 6 is a flow diagram of data between components of a system for distributing content according to example embodiments.

FIG. 6 is a flow diagram of data between components of system 101 according to example embodiments. As described herein, a user device 110 may transmit transceiver device configurations 602 and channel configurations 604 to content distribution apparatus 102. The transceiver device configurations 602 may include a transceiver device identifier and channel identifier pair indicating to which channel a particular transceiver device 120 will be tuned.

Channel configurations 604 may include any information defining content to be incorporated into the channel content, such as URLs, positioning and sizing information, durations, and/or the like, as described with respect to FIG. 3E above.

Content distribution apparatus 102 may cause transmission of generated channel content 610 to transceiver device 122. As described herein, the channel content 610 is generated based on the channel configuration associated with the channel identifier to which the transceiver device 122 is tuned. The channel content 610 may be transmitted in a format that the transceiver device 122 is configured to receive, including but not limited to, HTML5 (Hypertext Markup Language version 5), MPEG-DASH (Moving Picture Experts Groups Dynamic Adaptive Streaming), HLS (Hyptertext Transfer Protocol Live Streaming), and/or the Microsoft Smooth Streaming Protocol.

In some embodiments the transceiver device 122 may convert channel content 610 to a format compatible with display 120, such as a video format compatible for transmission by HDMI. Video content 620 may be transmitted to display 120 for display. In some embodiments, the received channel content 610 may already be in a video format for transmission to the display 120.

Figure 7:
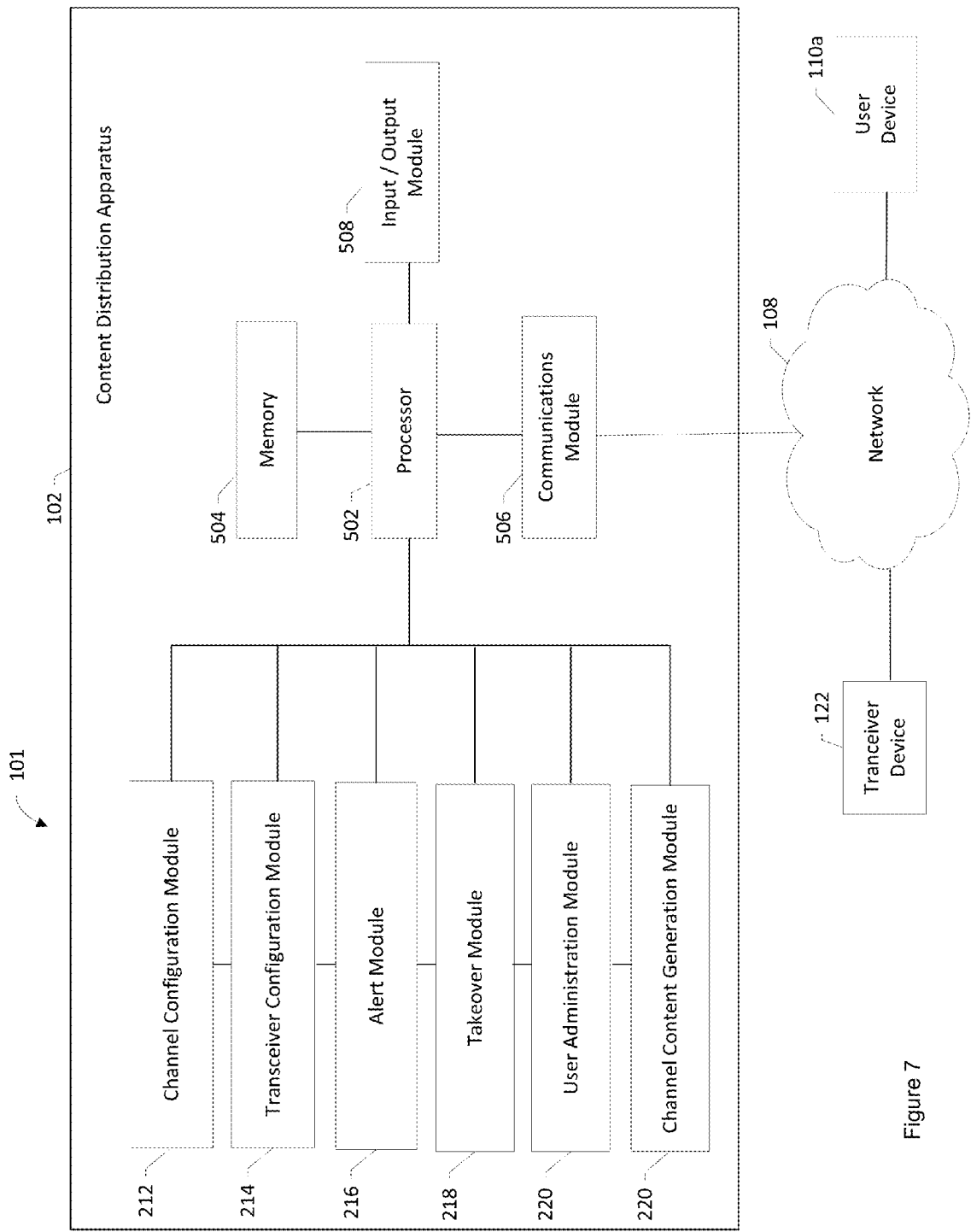
FIG. 7 is a schematic block diagram of a promotional system according to example embodiments.

Having now described the flow of data between components of system 101, FIG. 7 provides an implementation of system 101 according to an example embodiment.

In accordance with some example embodiments, content distribution apparatus 102 may include various means, such as one or more processors 702, memories 704, communications modules 706, and/or input/output modules 708. Content distribution apparatus 102 may further include channel configuration module 212, transceiver device configuration module 214, alert module 216, takeover module 218, user administration module 220 and/or channel content generation module 222, among other things (not shown). As referred to herein, the term "module" includes hardware, software and/or firmware configured to perform one or more particular functions. In this regard, content distribution apparatus 102 and/or system 101 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 704) that is executable by a suitably configured processing device (e.g., processor 702), or some combination thereof.

Processor 702 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 7 as a single processor, in some embodiments, processor 702 comprises a plurality of processors. The plurality of processors may be embodied on a single computing device or may be distributed across a plurality of computing devices collectively configured to function as content distribution apparatus 102. The plurality of processors may be in operative communication with each other and may be collectively configured to perform one or more functionalities of content distribution apparatus 102 as described herein. In an example embodiment, processor 702 is configured to execute instructions stored in memory 704 or otherwise accessible to processor 702. These instructions, when executed by processor 702, may cause promotional system 100 to perform one or more of the functionalities of content distribution apparatus 102 as described herein.

Whether configured by hardware, firmware/software methods, or by a combination thereof, processor 702 may comprise an entity capable of performing operations according to embodiments of the present invention while configured accordingly. Thus, for example, when processor 702 is embodied as an ASIC, FPGA or the like, processor 702 may comprise specifically configured hardware for conducting one or more operations described herein. As another example, when processor 702 is embodied as an executor of instructions, such as may be stored in memory 704, the instructions may specifically configure processor 702 to perform one or more operations described herein, such as those discussed in connection with FIG. 5.

Memory 704 may comprise, for example, volatile memory, non-volatile memory, or some combination thereof. Although illustrated in FIG. 7 as a single memory, memory 704 may comprise a plurality of memory components. The plurality of memory components may be embodied on a single computing device or distributed across a plurality of computing devices. In various embodiments, memory 704 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. In some embodiments, memory 704 may comprise a suitable network database (e.g., content repository 230, channel configuration database 232, transceiver device configuration database 234) configured to store information for content distribution operations and/or the like, as described herein. Additionally or alternatively, memory 704 may be configured to store such data as well as various applications, instructions, or the like for enabling content distribution apparatus 102 to carry out various functions in accordance with example embodiments of the present invention. For example, in at least some embodiments, memory 704 is configured to buffer input data for processing by processor 702. Additionally or alternatively, memory 704 may be configured to store program instructions for execution by processor 702. Memory 704 may store information in the form of static and/or dynamic information. This stored information may be stored and/or used by content distribution apparatus 102 during the course of performing its functionalities.

Communications module 706 may be embodied as any device or means embodied in circuitry, hardware, a computer program product comprising computer readable program instructions stored on a computer readable medium (e.g., memory 704) and executed by a processing device (e.g., processor 702), or a combination thereof that is configured to receive and/or transmit data from/to another device, such as, for example, a second content distribution apparatus 102 and/or the like. In some embodiments, communications module 706 (like other components discussed herein) can be at least partially embodied as or otherwise controlled by processor 702. In this regard, communications module 706 may be in communication with processor 702, such as via a bus. Communications module 706 may include, for example, an antenna, a transmitter, a receiver, a transceiver, network interface card and/or supporting hardware and/or firmware/software for enabling communications with another computing device. Communications module 706 may be configured to receive and/or transmit any data that may be stored by memory 704 using any protocol that may be used for communications between computing devices, such as content distribution apparatus 102, user device 110, and/or transceiver device 120. Communications module 706 may additionally or alternatively be in communication with the memory 704, input/output module 708 and/or any other component of promotional system 100, such as via a bus.

Input/output module 708 may be in communication with processor 702 to receive an indication of a user input and/or to provide an audible, visual, mechanical, or other output to a user (e.g., provider and/or consumer). As such, input/output module 708 may include support, for example, for a keyboard, a mouse, a joystick, a display, a touch screen display, a microphone, a speaker, a RFID reader, barcode reader, biometric scanner, and/or other input/output mechanisms. In embodiments wherein content distribution apparatus 102 is embodied as a server or database, aspects of input/output module 708 may be reduced as compared to embodiments where content distribution apparatus 102 is implemented as an end-user machine (e.g., user device 110) or other type of device designed for complex user interactions. In some embodiments (like other components discussed herein), input/output module 708 may even be eliminated from content distribution apparatus 102. Input/output module 708 may be in communication with the memory 704, communications module 706, and/or any other component(s), such as via a bus. Although more than one input/output module and/or other component can be included in content distribution apparatus 102, only one is shown in FIG. 7 to avoid overcomplicating the drawing (like the other components discussed herein).

Modules 212, 214, 216, 218, 220, and/or 222 may perform operations of the content distribution apparatus 102 as described herein. In some embodiments, some or all of the functionality of the modules 212, 214, 216, 218, 220, and/or 222 may be performed by processor 702. For example, non-transitory computer readable storage media can be configured to store firmware, one or more application programs, and/or other software, which include instructions and other computer-readable program code portions that can be executed to control each processor (e.g., processor 702 and/or any of the modules 212, 214, 216, 218, 220, and/or 222) of the content distribution apparatus 102 to implement various operations. As such, a series of computer-readable program code portions are embodied in one or more computer program products and can be used, with a computing device, server, and/or other programmable apparatus, to produce machine-implemented processes.

As described with respect to FIG. 1, content distribution apparatus 102 may be coupled to one or more user devices 110 and/or transceiver devices 120 via network 108.

As will be appreciated, any such computer program instructions and/or other type of code may be loaded onto a computer, processor or other programmable apparatus circuitry to produce a machine, such that the computer, processor, or other programmable circuitry that executes the code on the machine creates the means for implementing various functions, including those described herein.

It is also noted that all or some of the information presented by the example displays discussed herein can be based on data that is received, generated and/or maintained by one or more components of promotional system 100. In some embodiments, one or more external systems (such as a remote cloud computing and/or data storage system) may also be leveraged to provide at least some of the functionality discussed herein.

Promotion and Marketing Embodiment

As described above, the method, apparatus, and computer program products provided herein enable a user to customize content and distribute the content for display to a plurality of displays, some of which may be remotely located. In another example embodiment described below, a promotion and marketing service and provider may benefit from a content distribution apparatus 102.

As used herein, the term "provider" may be used interchangeably with "merchant" and may include, but is not limited to, a business owner, consigner, shopkeeper, tradesperson, vender, operator, entrepreneur, agent, dealer, organization or the like that is in the business of a providing a good, service or experience to a consumer, facilitating the provision of a good, service or experience to a consumer and/or otherwise operating in the stream of commerce. One example provider may be a running company that sells attire for use by a person who runs or participates in athletic activities.

The promotion and marketing service (e.g., a service that provides promotion and/or marketing services on behalf of one or more providers that are offering one or more instruments that are redeemable for goods, services, experiences and/or the like by a consumer) may engage in business with a provider to offer a promotion.

Figure 8:
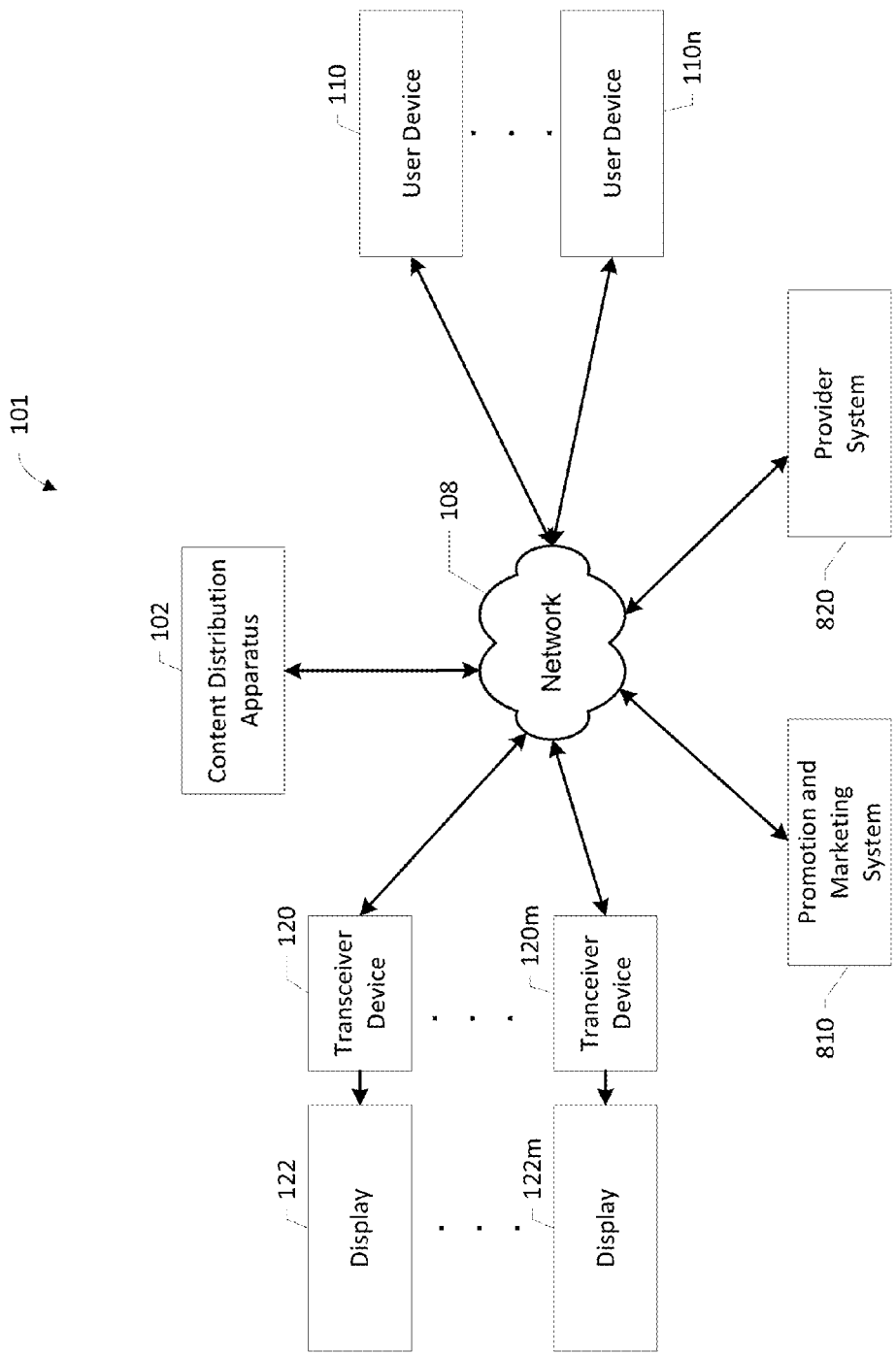
FIG. 8 is a schematic representation of a system for distributing content according to example embodiments.

As shown in FIG. 8, promotion and marketing system 810 and provider system 820 may interact with content distribution apparatus 102, user devices 110, and/or transceiver devices 120 over network 108. The promotion and marketing system 810 and provider system 820 may be considered $3^{rd}$ party systems that operate remotely and in some embodiments, independently, other than their respective interactions with content distribution apparatus 102, for example. For example, the promotion and marketing service may provide a pre-configured transceiver device 120 to the provider for use in the provider's retail spaces, offices, and/or the like. The transceiver device 120 may be configured to operate within the provider's LAN, which may be included in network 108.

The provided transceiver device 120 and/or transceiver device configuration database 234 may be preconfigured such that the transceiver device 120 is tuned to a specified channel. The user administration module 220 may, in some embodiments, prevent provider 820 from reconfiguring the transceiver device configurations and/or channel configurations. A preconfigured channel may comprise, for example, one URL associated with the promotion and marketing service 810, and a URL associated with the provider system 820. The promotion and marketing service may therefore ensure some level of control over the content displayed using the provided transceiver devices 120. In some examples, the transceiver device 120 and/or transceiver device configuration database 234 may be preconfigured based on images, content, media or the like retrieved from a provider's website, marketing materials, reviews, third party sites or the like.

As an example, the promotion and marketing service may include a logo or advertisement in a portion of the channel content. In some examples, a section of channel content may be provided by an application of the promotion and marketing system 810, showing available promotions offered on behalf of the promotion and marketing service for use at the provider, and/or promotional content provided by a promotion and marketing service and customized for a provider. As another example, a URL may be associated with provider metric content provided by the promotion and marketing service, wherein the provider metric content describes at least provider profit based on data collected by the promotion and marketing service. As another example, any metrics relating to sales, revenue, and/or profits, as tracked and calculated by the promotion and marketing service on behalf of the provider may be displayed via the specified channel. In some examples, such information can be run or otherwise accessed by a manager, sales staff or the like to view real time or semi-real time performance of a provider business, a category of businesses similar to that of the provider, businesses that are proximate to the provider or the like.

In some embodiments, a designated section of the channel content may be allotted for the provider system 820. For example, the channel configuration may be preconfigured to point to a specific URL accessed on an application server of the provider system 820. While the provider system 820 may not be permitted to configure channels, the provider system 820 may modify the content provided via the specified URL such that the provider system 820 controls at least a portion of the channel content disseminated to displays in the network 108. In this regard, the provider may provide daily menus, specials, deals, promotions, company and/or employee updates, and/or the like in the designated section of the channel content. In some examples, live content may be included, such as sporting events, news events or the like.

The user administration module 220 may be configured to control what access users of the provider system 820 have over the content distribution apparatus 102. For example, in some embodiments, a particular provider and/or employee of the provider may have access to push alerts to a number of transceiver devices 120.

Any number of configurations of the content distribution apparatus 102 may can be customized such that control by the promotion and market system 810 and provider 820 is divided and/or shared. Both entities may benefit from such an arrangement. The promotion and marketing service may publish content to displays in a $3^{rd}$ party facility, thereby increasing visibility. The promotion and marketing service 810 may even sell such implementations to providers. Providers may benefit by having promotion and marketing service content, some of which may be especially generated for the provider, seamlessly streamed to devices in their retail stores and/or offices.

CONCLUSION

The computer-implemented method, apparatus and computer program product provided herein provide distinct advantages over current methods of distributing content to displays. Whereas many implementations require that a display be controlled by a pre-defined and/or static control device, the content distribution apparatus 102 provides a centralized access point and interface by which authorized users can direct a plurality of transceiver devices, and thus a plurality of displays to display content provided by respective channels. As such, the method, apparatus and computer program product provide numerous technical advantages including the conservation of processing resources and the associated power consumption otherwise expended to support the control of numerous different transceiver devices. For example, a user may configure any number of transceiver devices, or all available transceiver devices to provide content from a single source, from a single interface, as opposed to accessing individual interfaces for each transceiver device.

Moreover, while some users may access transceiver device configurations, the same or other users may access channel configurations to control what content is provided via the various channel, possibly independently of the transceiver device configurations. In this regard, the separation of control being transceiver and channel association in comparison to channel and content associations enable for efficient coordination of content provision to a large number of displays and/or users. Embodiments therefore provide distinct technical advantages over alternative implementations in which users would need to make multiple different entries to define individual transceiver device and channel pairings, as well as individual channel and channel content associations.

Even further, the customization of the content channels enables different users or user groups to provide content to different portions of a display, or such that the display rotates between different content channels. In this regard the different users or user groups can control portions of the content independent of one another without having to coordinate changing control or administration of the transceiver devices or channels. In this regard, additional improvements to known display control interfaces are provided.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 702, modules 212, 214, 216, 218, 220 and/or 222 to produce a machine, such that the computer program product includes the instructions which execute on the computer or other programmable data processing apparatus create a means for implementing the functions specified in the flowchart block or blocks.

These computer program instructions may also be stored in a computer-readable storage medium (e.g., memory 704) that can direct a computer or other programmable data processing apparatus to function in a particular manner, such that the instructions stored in the computer-readable storage medium produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computer-implemented method for remotely controlling content distribution to at least one transceiver device, the method comprising:
 receiving a channel configuration from a channel configuration module, the channel configuration provided to the channel configuration module via at least a user interface operative on a user device that is remote from the at least one transceiver device, and the channel configuration comprising (a) at least two uniform resource locators (URLs), and (b) at least one of (i) for each URL, indications of respective positions and sizing relative to a display screen in which content associated with each URL is to be displayed, or (ii) indications of respective durations for which content associated with each URL is to be displayed before a display controlled via the at least one transceiver device changes to display content associated with another of the URLs;
 storing the channel configuration in association with the channel identifier on a content distribution apparatus;
 receiving an indication of at least one transceiver device selected from a plurality of transceiver devices, wherein the indication indicates the at least one transceiver device is to be associated with the channel identifier;
associating the channel identifier with the at least one transceiver device, such that channel content generated based on the channel configuration comprising the at least two URLs and associated with the channel identifier is received by the at least one transceiver device via a network interface and transmitted by the at least one transceiver device for display according to at least one of the respective positions and the sizing or the respective durations indicated by the channel configuration provided via the user interface of the remote user device;
receiving via the channel configuration module an indication of a takeover channel identifier selected from a plurality of channel identifiers associated with respective channel configurations; and
controlling communication with all transceiver devices in a network such that all of the transceiver devices in the network access the at least one URL indicated by the channel configuration associated with the takeover channel identifier.

2. The computer-implemented method of claim 1, wherein the at least one transceiver device is in data communication with a display and is configured to receive at least one of wired or wireless signals from the channel configuration module; and wherein associating the channel identifier with the at least one transceiver device comprises causing the generated channel content to be transmitted via the at least one wired or wireless signals for broadcasting on the display.

3. The computer-implemented method of claim 1, further comprising:
generating the channel content based on the channel configuration, wherein the generating the channel content comprises at least one of rendering hypertext markup language or streaming content via a streaming protocol compatible with the at least one transceiver device.

4. The computer-implemented method of claim 1, wherein the channel configuration further comprises at least two URLs and a respective position and a respective size for each of the at least two URLs with respect to the channel content.

5. The computer-implemented method of claim 1, wherein the channel configuration comprises at least two URLs and a respective duration for which each of the two URLs are to be displayed.

6. The computer-implemented method of claim 1, further comprising:
receiving an indication of an alert message; and
causing respective channel content associated with all available channel identifier to be updated to include the alert message.

7. The computer-implemented method of claim 1, wherein the computer-implemented method further comprises:
receiving an indication of local content on a remote user device;
causing transmission of the local content to the content distribution apparatus; and
associating the local content with the channel configuration.

8. An apparatus for remotely controlling content distribution to at least one transceiver device, the apparatus comprising:

a channel configuration module, configured to, when executed by a processor, access a channel configuration provided by at least a user interface operative on a remote user device that is remote from the at least one transceiver device, wherein the channel configuration is stored in association with a channel identifier, the channel configuration comprising (a) at least two uniform resource locator (URLs) and (b) at least one of (i) for each URL, indications of respective positions and sizing relative to a display screen in which content associated with each URL is to be displayed, or (ii) indications of respective durations for which content associated with each URL is to be displayed before a display controlled via the at least one transceiver device changes to display content associated with another of the URLs; and
a transceiver device configuration module, configured to, when executed by the processor, access a transceiver device configuration comprising an association of the at least one transceiver device and the channel identifier, such that channel content generated based on the channel configuration comprising the at least two URLs and associated with the channel identifier is received by the at least one transceiver device via a network interface and transmitted by the at least one transceiver device for display according to at least one of the respective positions and the sizing or the respective durations indicated by the channel configuration provided via the user interface of the remote user device,
wherein the channel configuration module is further configured to receive an indication of a takeover channel identifier selected from a plurality of channel identifiers associated with respective channel configurations and to control communication with all transceiver devices in a network such that all of the transceiver devices in the network access the at least one URL indicated by the channel configuration associated with the takeover channel identifier.

9. The apparatus of claim 8, wherein the at least one transceiver device is in data communication with a display and is configured to receive at least one of wired or wireless signals from the channel configuration module; and wherein associating the channel identifier with the at least one transceiver device comprises causing the generated channel content to be transmitted via the at least one wired or wireless signals for broadcasting on the display.

10. The apparatus of claim 8, further comprising:
a channel content generation module, configured to, when executed by the processor, generate the channel content based on the channel configuration, wherein the generating the channel content comprises at least one of rendering hypertext markup language or streaming content via a streaming protocol compatible with the at least one transceiver device.

11. The apparatus of claim 8, wherein the channel configuration comprises the at least two URLs and the respective position and a respective size for each of the at least two URLs relative to the display screen in which content associated with each URL is to be displayed.

12. The apparatus of claim 8, wherein the channel configuration comprises the respective durations for which each of the two URLs are to be displayed before the display changes to display content associated with another of the URLs.

13. The apparatus of claim 8, further comprising:
an alert module configured to, when executed by the processor, a) receive an indication of an alert message; and
b) cause respective channel content associated with all available channel identifier to be updated to include the alert message.

14. The apparatus of claim 8, further comprising a channel content generation module, configured to, when executed by the processor:
receive an indication of local content on a remote user device;
cause transmission of the local content to the content distribution apparatus; and
associate the local content with the channel configuration.

15. A computer program product for remotely controlling content distribution to at least one transceiver device, the computer program product comprising at least one non-transitory computer-readable medium having computer-readable program instructions stored therein, the computer-readable program instructions comprising:
a channel configuration module, configured to, when executed by a processor, access a channel configuration provided by a user interface operative on a remote user device that is remote from the at least one transceiver device, wherein the channel configuration is stored in associated with a channel identifier, the channel configuration comprising (a) at least two uniform resource locator (URLs) and (b) at least one of (i) for each URL, indications of respective positions and sizing relative to a display screen in which content associated with each URL is to be displayed, or (ii) indications of respective durations for which content associated with each URL is to be displayed before a display controlled via the at least one transceiver device changes to display content associated with another of the URLs; and
a transceiver device configuration module, configured to, when executed by the processor, access a transceiver device configuration comprising an association of the at least one transceiver device and the channel identifier, such that channel content generated based on the channel configuration and associated with the channel identifier is received by the at least one transceiver device via a network interface and transmitted by the at least one transceiver device for display according to at least one of the respective positions and the sizing or the respective durations indicated by the channel configuration provided via the user interface of the remote user device,
wherein the channel configuration module is further configured to receive an indication of a takeover channel identifier selected from a plurality of channel identifiers associated with respective channel configurations and to control communication with all transceiver devices in a network such that all of the transceiver devices in the network access the at least one URL indicated by the channel configuration associated with the takeover channel identifier.

16. The computer program product of claim 15, wherein the at least one transceiver device is in data communication with a display and is configured to receive at least one of wired or wireless signals from the channel configuration module; and wherein associating the channel identifier with the at least one transceiver device comprises causing the generated channel content to be transmitted via the at least one wired or wireless signals for broadcasting on the display.

17. The computer program product of claim 15, further comprising:
a channel content generation module, configured to, when executed by the processor, generate the channel content based on the channel configuration, wherein the generating the channel content comprises at least one of rendering hypertext markup language or streaming content via a streaming protocol compatible with the at least one transceiver device.

18. The computer program product of claim 15, wherein the channel configuration comprises the at least two URLs and the respective position and the respective size for each of the at least two URLs relative to the display screen in which content associated with each URL is to be displayed.

19. The computer-implemented method of claim 1, wherein the computer-implemented method further comprises:
receiving via the channel configuration module, an indication of a preconfigured duration for which all the transceiver devices in the network are controlled to access the at least one URL indicated by the channel configuration associated with the takeover channel identifier; and
after the preconfigured duration, controlling the communication of all the transceiver devices to revert to accessing respective URLs associated prior channel configurations.

20. The computer-implemented method of claim 1, wherein the computer-implemented method further comprises identifying all the transceiver devices in the network for takeover without user selection of all the transceiver devices in the network.

* * * * *